(12) United States Patent
Srinivasaiah

(10) Patent No.: US 8,285,716 B1
(45) Date of Patent: Oct. 9, 2012

(54) IDENTIFYING AND RANKING DIGITAL RESOURCES RELATING TO PLACES

(75) Inventor: Manjunath Srinivasaiah, New York, NY (US)

(73) Assignee: Google Inc., Mountain View, CA (US)

( * ) Notice: Subject to any disclaimer, the term of this patent is extended or adjusted under 35 U.S.C. 154(b) by 236 days.

(21) Appl. No.: 12/643,773

(22) Filed: Dec. 21, 2009

(51) Int. Cl.
*G06F 7/00* (2006.01)
*G06F 17/30* (2006.01)

(52) U.S. Cl. ........................................................ 707/730
(58) Field of Classification Search ................... 707/730
See application file for complete search history.

(56) References Cited

U.S. PATENT DOCUMENTS

| | | | |
|---|---|---|---|
| 7,912,837 B2 * | 3/2011 | Buron et al. ................... 707/723 |
| 2005/0080795 A1 * | 4/2005 | Kapur et al. ................... 707/100 |
| 2005/0108213 A1 * | 5/2005 | Riise et al. ........................ 707/3 |
| 2006/0036582 A1 * | 2/2006 | Sondergaard et al. ............ 707/3 |
| 2006/0149734 A1 * | 7/2006 | Egnor et al. ........................ 707/7 |
| 2006/0149742 A1 * | 7/2006 | Egnor ............................... 707/10 |
| 2007/0143345 A1 * | 6/2007 | Jones et al. ................. 707/104.1 |
| 2007/0271259 A1 * | 11/2007 | Lee et al. ........................... 707/5 |
| 2008/0005094 A1 * | 1/2008 | Cunnane et al. ................... 707/4 |
| 2008/0010126 A1 * | 1/2008 | Gunshor et al. ................. 705/14 |
| 2008/0147631 A1 * | 6/2008 | Leffingwell et al. .............. 707/5 |
| 2008/0168033 A1 * | 7/2008 | Ott et al. ............................ 707/3 |
| 2009/0112537 A1 * | 4/2009 | Okumura .......................... 703/3 |
| 2009/0119255 A1 * | 5/2009 | Frank et al. ....................... 707/3 |
| 2009/0282013 A1 * | 11/2009 | Joshi et al. ........................ 707/5 |
| 2011/0218992 A1 * | 9/2011 | Waldman et al. ............. 707/724 |

* cited by examiner

*Primary Examiner* — Robert Beausoliel, Jr.
*Assistant Examiner* — Nicholas Allen
(74) *Attorney, Agent, or Firm* — Fish & Richardson P.C.

(57) ABSTRACT

Methods, apparatuses, and systems for identifying and ranking digital resources relating to places. A keyword included in a search query that is received, is determined to be a name of a place. A database of names of distinct places that uniquely identifies distinct places that have a same name is searched. It is determined that the database associates the keyword with a first and a second place. First and second resources, determined to be relevant to the first and the second place, respectively, are identified from the database. In response to receiving the search query, search results directed to the first place and separate search results directed to the second place are provided. The search results include one or more links to the provided one or more resources.

54 Claims, 8 Drawing Sheets

IDENTIFYING AND RANKING DIGITAL RESOURCES RELATING TO PLACES

BACKGROUND

This specification relates to identifying resources responsive to a search query.

A name can refer to more than one place. For example, "Rome" can refer to "Rome, Italy" or "Rome, Ga." Places can be the topics of searches by users using a search engine, for example, an Internet search engine. Typically, when a search engine searches for resources, in response to receiving a search query, the search engine searches an index of resources for resources that are relevant to the search query. For example, when a search query that includes "Rome" is searched, the search results can include references both to resources that refer to "Rome, Italy" and to resources that refer to "Rome, Ga." Thus, the search results can include references to resources that are potentially relevant to distinct places that have the same name. The distinct places may be of the same or different types, for example, cities and countries.

SUMMARY

This specification describes identifying and ranking resources that refer or are relevant to particular places.

In general, one innovative aspect of the subject matter described in this specification can be embodied in methods that include the actions of receiving a search query including a keyword. The actions also include determining that the keyword is a name of a place and searching for the keyword in a database of names of distinct places. The database uniquely identifies distinct places that have a same name. The database associates each distinct place to one or more digital resources determined to be relevant to the distinct place. For a name of the distinct place, the database includes data identifying the one or more digital resources. The actions also include determining that the database associates the keyword with a first place and a second place, and identifying from the database, first one or more resources and second one or more resources that have been determined to be relevant to the first place and the second place, respectively. The database associates the first place with the first one or more resources and the second place with the second one or more resources. In response to receiving the search query, the method includes providing search results directed to the first place with one or more links to the first one or more resources and separate search results directed to the second place with one or more links to the second one or more resources. The actions are performed by data processing apparatus.

These and other embodiments can each optionally include one or more of the following features, alone or in combination. Presenting the two distinct responses can further include ranking the first one or more resources in an order based on a relevance of each of the first one or more resources to the first place, and providing the ranked first one or more resources according to the order. The methods can further include ranking the first one or more resources based on a frequency of occurrence of an item of content indicative of the name of the first place in the first one or more resources. A resource can be determined to be relevant to the distinct place by finding items of content in the resource that are indicative of multiple places including the distinct place, determining multiple ratios, each ratio being a number of items of content indicative of a place of the multiple places to a number of items of content indicative of all of the multiple places, determining a greatest ratio of the multiple ratios, and assigning the place corresponding to the greatest ratio as the distinct place. The items of content can include names of popular landmarks located in the distinct place. The methods can further include determining one or more top greatest ratios excluding the greatest ratio of the plurality of ratios, and assigning each place corresponding to the top greatest ratios as distinct places to which the resource is relevant. The resource can be a document that includes a title and a body, each including text. The item of content indicative of the distinct place can be text included in either the title or the body. The methods can further include, upon determining that the item of content indicative of the distinct place is in the title, assigning a first likelihood value that the resource is relevant to the distinct place, and upon determining that the item of content is in the body, assigning a second likelihood value that is less than the first likelihood value that the resource is relevant to the distinct place. The methods can further include determining an offset of the item of content from a beginning of the body, determining if the item of content is near the beginning of the body or not near the beginning of the body based on the offset, and upon determining that the item of content is near the beginning of the body, assigning the likelihood value to be greater than the second likelihood value if the item of content is not near the beginning of the body. A resource can be determined to be relevant to the distinct place by identifying multiple links in multiple resources, each of which includes corresponding one or more links that point to the resource. Each of the multiple links can be a string of text. The methods can further include determining, from among the multiple links, a subset of links that have respective anchor texts that are names of places, and determining that one of the names of places is a name of the distinct place based on a number of links in the subset of links that have respective anchor texts that are the names of the distinct place.

Other embodiments of foregoing aspect include corresponding systems, apparatus, and computer programs recorded on computer storage devices, each configured to perform the operations of the methods.

In general, another innovative aspect of the subject matter described in this specification can be embodied in systems that include data processing apparatus and a computer-readable medium tangibly encoding software instructions executable by the data processing apparatus to perform operations that include receiving a digital resource that includes multiple items of content, finding items of content in the resource that are indicative of multiple places, determining multiple ratios, each ratio being a number of items of content indicative of a place of the multiple places to a number of items of content indicative of all of the multiple places, determining a greatest ratio of the multiple ratios and a corresponding most likely place from among the multiple places, and identifying the most likely place as a place to which the digital resource is relevant.

In general, another innovative aspect of the subject matter described in this specification can be embodied in systems that include data processing apparatus and a computer-readable medium tangibly encoding software instructions executable by the data processing apparatus to perform operations that include identifying multiple links in multiple resources, each link having a target and having the same resource as the link target and each link having a respective anchor text, determining, from among the multiple links, a subset of links that have respective anchor texts that are names of places, and determining that one of the names of places is a name of a distinct place based on a number of links in the subset of links that have respective anchor texts that are the names of the distinct place and identifying the distinct place as a place relevant to the resource.

Particular implementations of the subject matter described in this specification can be implemented to realize one or more of the following advantages. The places referred to by multiple resources can be disambiguated to identify a distinct entity described by each resource. The disambiguated resources can be identified in a database that associates resources to places, and that is searchable by the names of the places, rather than by text found in a resource. Search results obtained by searching the database can be specific to a distinct place named in a keyword rather than generally all resources that include the keyword. Further, the search results including resources relevant to a distinct place can be ranked to present the most relevant resources first. In addition, news stories that are local to a distinct place can be identified and presented, based on the search results.

The details of one or more implementations of the specification are set forth in the accompanying drawings and the description below. Other features, aspects, and advantages of the specification will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
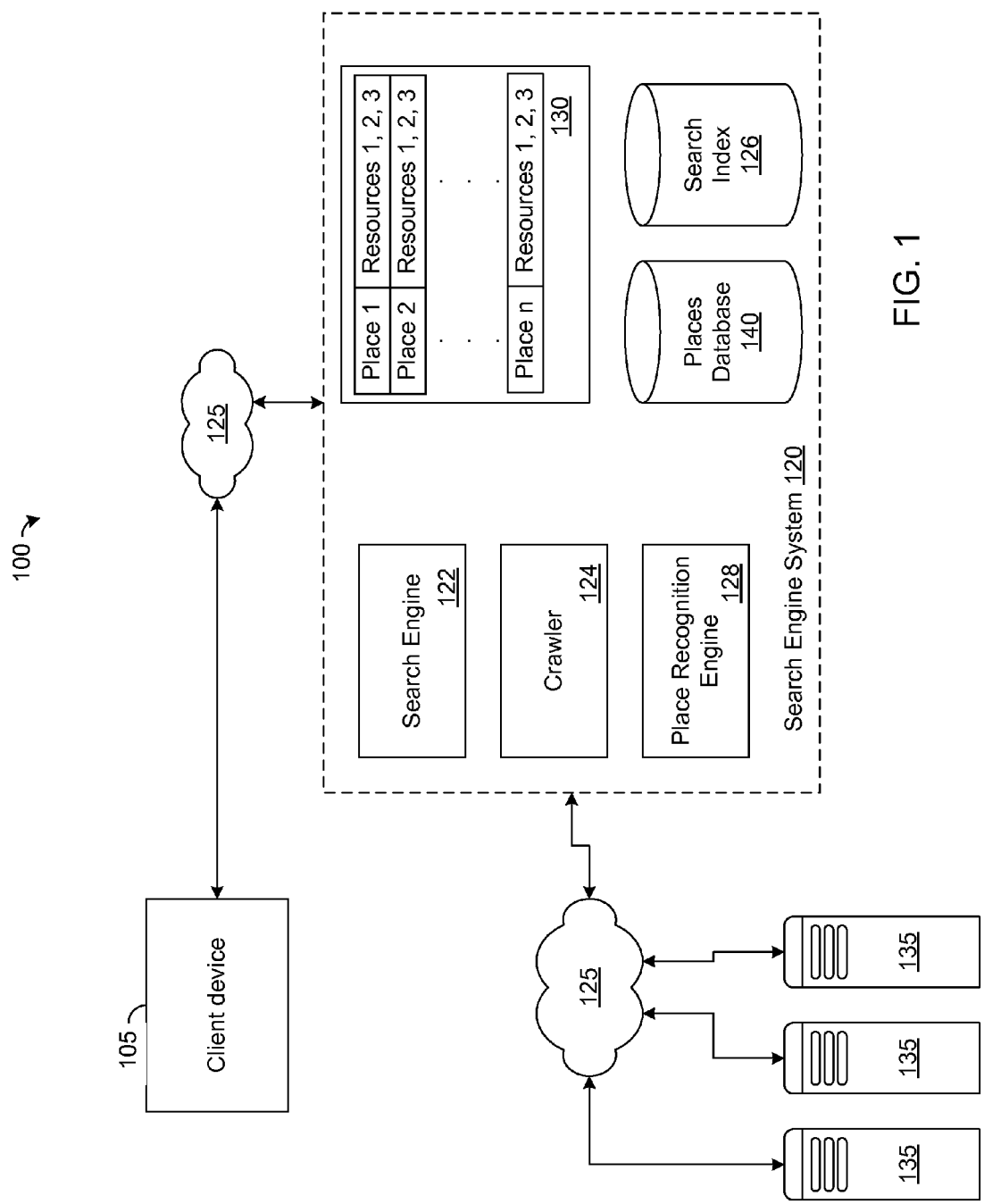
FIG. 1 shows an example search engine system that can receive search queries from and present search results to a client device.

FIG. 1 shows an example search engine system 120 that can receive search queries from and present search results to a client device 105. The client device 105 can be any digital device used by a user to access the search engine system 120, for example, a mobile phone or a personal computer connected to the Internet.

The search engine system 120 includes a search engine 122 configured to search for and distinguish resources relevant to distinct places that have the same name. The search engine system 120 can communicate with multiple resource hosts 135, each of which stores multiple resources, over one or more data communication networks. A resource is a digital resource that can be individually addressed, for example, using a Uniform Resource Locator (URL). A resource can be in any format, for example, text, image, audio, video, and the like.

The search engine system 120 includes a crawler 124 that crawls resources stored in the resource hosts 135 and stores information about them in search index 126. The search engine system 120 also includes place recognition engine 128 that identifies resources stored on the resource hosts 135 that are indicative of places that have a geographical location, i.e., resources in which or in reference to which there is data or metadata that indicates that the resources are relevant to the places. Each of the search engine 122, crawler 124, and place recognition engine 128 are implemented in the system 120 as one or more software modules running on one or more computers in one or more locations. The search engine system 120 also includes a places database 140, which is a repository of information pertaining to geographical places including place names, geographic locations (for example, longitude and latitude), popular landmarks, if any, and the like.

In addition, the places database 140 stores mappings of strings of text that refer to a place, to the place. For example, "White House" can refer to one or more places and additionally to the White House in Washington D.C. In the places database 140, a mapping is stored mapping the text "White House" to "Washington D.C." Similarly, "Eiffel Tower" is related to "Paris." In the places database 140, each geographical place is identified by a unique identifier. The places database also stores associations between multiple names that refer to the same distinct place. For example, "Mumbai" and "Bombay" are two different names of the same place. The places database 140 stores an association between "Mumbai" and "Bombay" that identifies them as the same place. Furthermore, the places database 140 stores geographic location information, for example, latitude/longitude/altitude, for each place. Names of places in languages other than English are mapped to the name of the place in English, and the mappings are stored in the places database 140. In addition, places to which a distinct place is related are also stored in the places database 140. For example, if the distinct place is a city, then each of the county, the province, the country, and the continent, in which the distinct place is located are mapped to the distinct place, and the mappings stored in the places database 140. Additional information about the distinct places, for example, the area, the population, and the like, are also stored in the places database 140.

Figure 2:
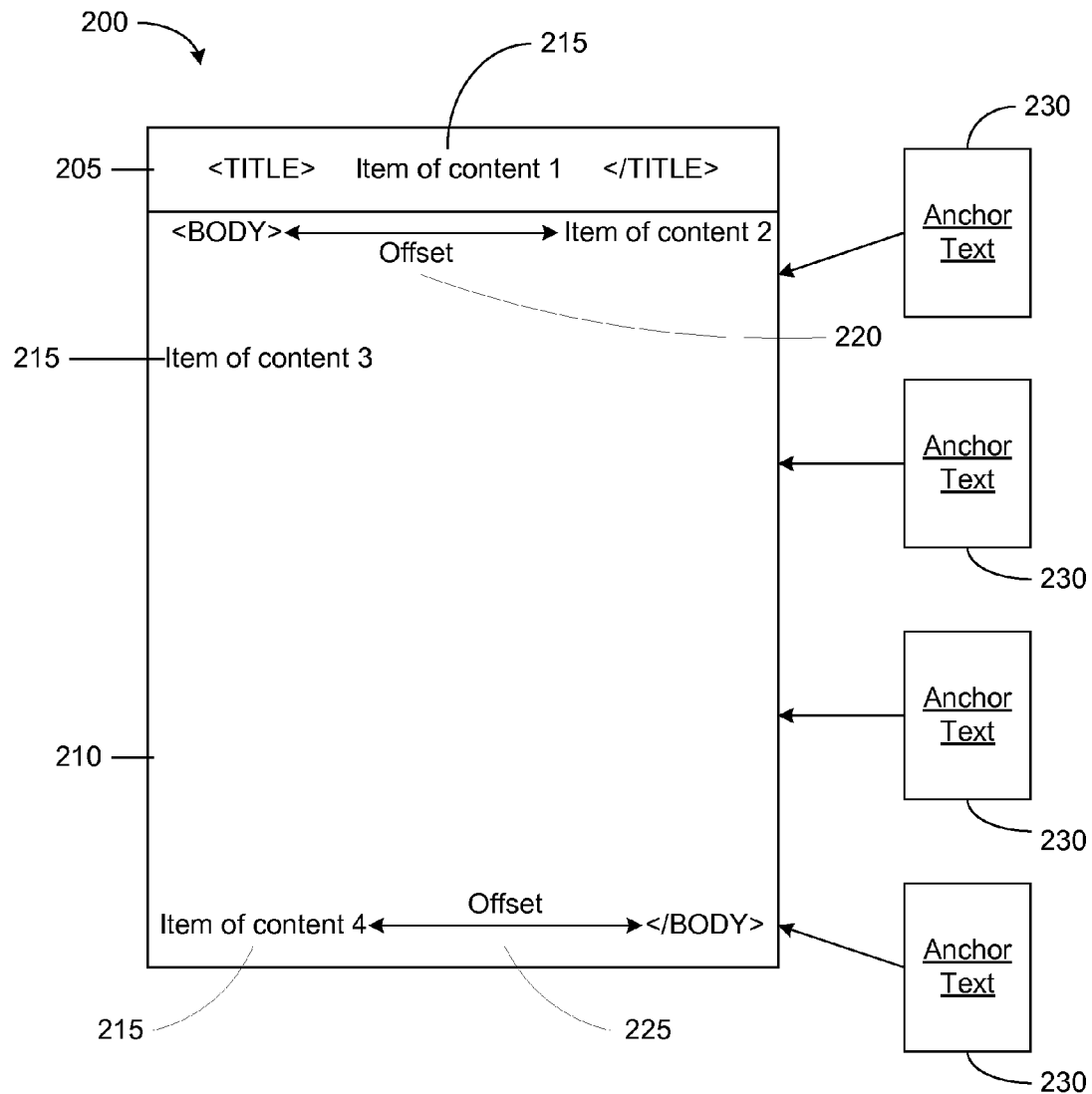
FIG. 2 shows an example of a resource that is relevant to a place.

FIG. 2 shows an example resource 200 that is relevant to a place. The example resource 200 is a document that includes text describing or referring to a distinct place. Resources of other formats, including audio, video, image, can be embedded in the resource 200. The resource 200 includes text including the words "Rome" and "Italy" and an image resource displaying a popular landmark in Rome, Italy. The resource 200 includes a title section 205 and a body section 210. In this example, the resource 200 is a Hyper Text Markup Language (HTML) document including HTML tags "<TITLE></TITLE>" and "<BODY></BODY>" to demarcate the title section 205 and the body section 210, respectively. All items of content 215 in the resource 200, including the items in the title section 205 and the body section 210, can be identified and indexed by a crawler, for example, the crawler 124. Further, the resource 200 is individually addressable by a corresponding URL.

Each section of a resource includes multiple items of content, for example, words or phrases of text. An item of content can be found in a title section or in a body section or in both. For example, the word "Rome" might be found in both the title and the body of the text document. The position of an item of content in a body section can be determined by an offset of the item from the beginning of the body section.

Further, several resources 230, stored on one or more resource hosts 135, can include links to the resource 200. HTML links generally include anchor text. Anchor text can be relevant descriptive or contextual information about the resource to which the hyperlink points. Anchor text will generally be related to the content of the resource to which the link containing the anchor text points.

Figure 3:
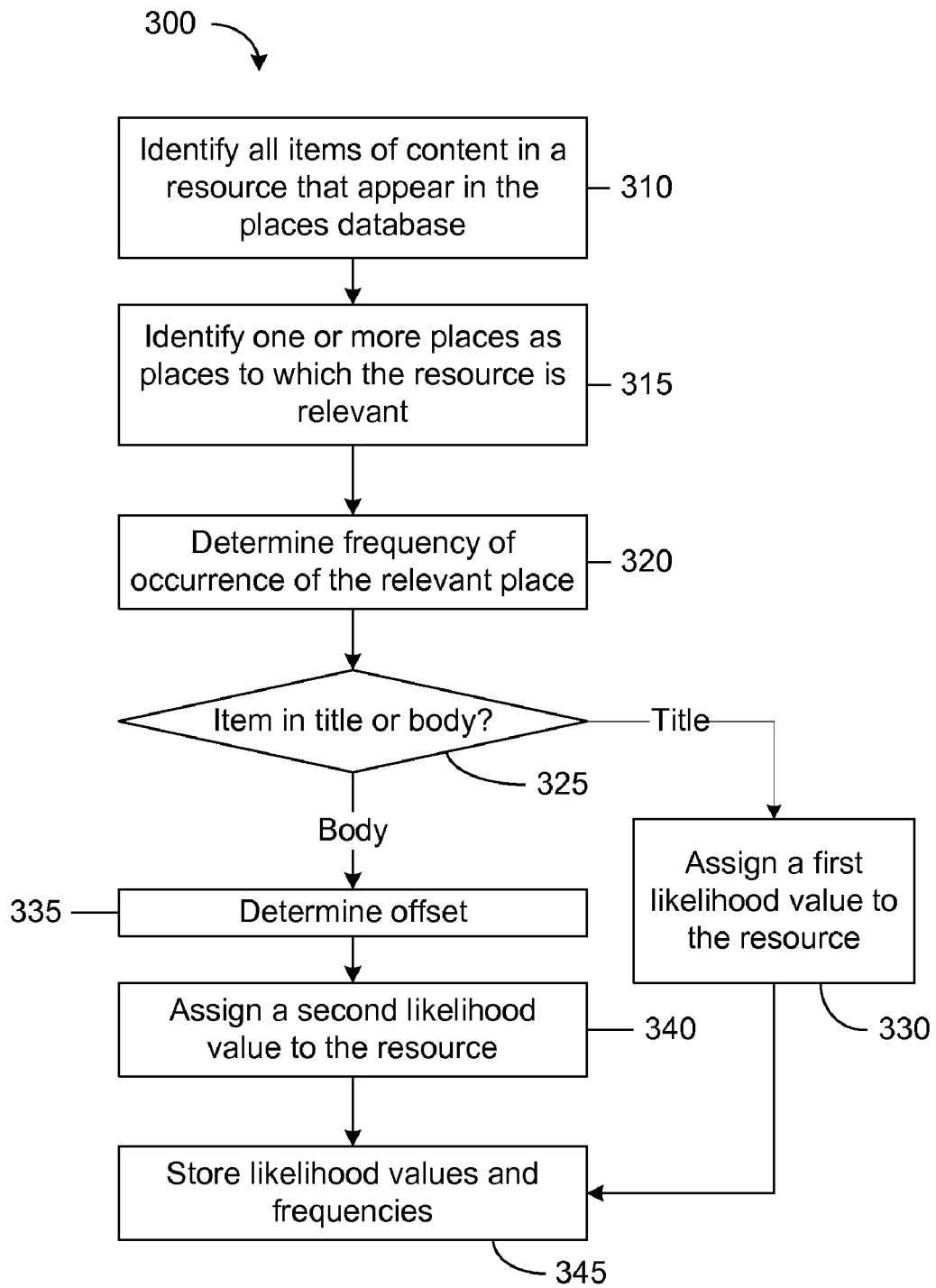
FIG. 3 is a flowchart of an example process to determine whether a resource is relevant to a place.

FIG. 3 is a flowchart of an example process 300 to determine whether a resource is relevant to a place. The process can be implemented in a data processing system by computer software that performs the operations of the process, for example, a system like search engine system 120. The process 300 identifies all items of content in a resource that appear in the places database 140 (step 310). An item of content is a string that includes one or more words or phrases. For example, the search engine system 120 searches for and extracts the string from the search index 128. If the identified string of text is found in the places database 140 as the name of a place or as a name that refers to a place, then the place recognition engine 128 determines that the item of content is a name of a place. As described previously, mappings between places and strings of text referring to the places are stored in the places database 140. For example, the places database 140 can include a mapping between "Coliseum" and "Rome" that indicates that the text "Coliseum" can refer to "Rome." Accordingly, if the place recognition engine 128 identifies a mapping between the identified item of content and a place in the places database 140, then the place recognition engine 128 determines that the identified item of content refers to a place.

In some implementations, the place recognition engine 128 associates a particular value, for example, 1, with the string of text found in the places database 140 to indicate that the string is a place. If the string is not found in the places database 140, then the place recognition engine 128 associates a different value, for example, 0, with the string, indicating the string is not a place. A resource can include names of distinct places. A distinct place can be mentioned one or more times in the resource. By repeatedly identifying items of content in a resource and searching for each identified item in the places database 140, the place recognition engine 128 identifies all distinct places named in the resource, insofar as the places may be found in the places database 140.

The process 300 identifies one or more places as places to which the resource is relevant (step 315). In some implementations, the places database 140 stores geographic locations in a hierarchical arrangement, for example, as is described in detail with reference to FIG. 7A and FIG. 7B. For example, one chain in the hierarchy is "Planet Earth"→"Europe"→"Italy"→"Rome." While "Planet Earth" is the top most level in the hierarchy, each lower level represents a sub-region included in a larger region represented by the region in the upper level. Thus, continents represent sub-regions of planet Earth, countries generally represent sub-regions of each continent, states or provinces represent sub-regions of each country, cities represent sub-regions of each state or province, and so on. Some countries span more than one continent, for example, Egypt (Africa and Asia), Russia (Europe and Asia). Each of these countries is stored as a sub-region of each continent that it spans. The place recognition engine 128 identifies distinct places previously determined as being named in the resource. Each distinct place in the resource is a candidate place to which the resource potentially can be relevant. To narrow the list of candidate places, the place recognition engine 128 identifies the sub-region at a level in the hierarchy immediately below "Planet Earth" that includes most of the distinct places named in the resource.

To do so, for each node in the hierarchy for which "Planet Earth" is the immediate parent node, i.e., for each continent, the place recognition engine 128 determines a ratio of a number of distinct places named in the document that are included in the continent to a number of distinct places named in the document irrespective of the continent. The place recognition engine 128 identifies the greatest ratio from among the ratios for the continents, and on that basis identifies the continent having the greatest ratio as the continent to which the resource is relevant. The place recognition engine 128 trims the list of continents to the continent with the greatest ratio and trims the list of candidate places to only those places that are in that continent.

Within the continent, for each country, the place recognition engine 128 determines a ratio of a number of remaining candidate places in each country to a number of remaining candidate places in the continent irrespective of the country to determine a greatest ratio for each country in the continent, and selects the country with the highest ratio as the country to which the resource is relevant. Subsequently, the place recognition engine 128 trims the list of countries to the country with the greatest ratio and trims the list of candidate places to only those places that are in that. Within the country, for each state or province, the place recognition engine 128 repeats this process until the lowest level in the hierarchy is reached. In this manner, for each level in the hierarchy, a place is determined to which the resource is relevant.

In some scenarios, when the ratios of a level in the hierarchy are compared, two or more ratios may be equal or substantially equal to each other. For example, equal numbers of distinct places having the same name may be found in two continents. In that case, the ratio of number of distinct places named in the resource and in a continent to a number of distinct places named in the resource irrespective of the continent are equal for the two continents. Similarly, if the numbers of distinct places in the two continents are not substantially different, then the corresponding ratios can be substantially equal to each other. In some implementations, when this occurs the place recognition engine 128 determines that that the resource is relevant to both continents. In such scenarios and implementations, in addition to the greatest ratio, the place recognition engine 128 identifies the top greatest ratios, for example, top two greatest ratios, and selects the continents corresponding to the top greatest ratios as the continents to which the resource is relevant. When the place recognition engine 128 trims the list of candidate places and continents, all the selected continents and all candidate places within the selected continents remain after trimming. Lower level determinations, as described above, are performed for each continent.

The process 300 determines a frequency of occurrence of the relevant place (step 320). For example, the place recognition engine 128 determines a number of times that the name of each distinct place to which the resource is determined to be relevant, appears in the resource.

The process 300 checks if the item of content is in the title or body of the resource (step 325). If the resource is markup language document, for example, an HTML document, the process 300 can determine a position of the text in the resource 200 by identifying the tags between which the text is embedded. If the item of content is in a title section, then the process 300 assigns a first likelihood value to the resource (step 330). The first likelihood value is a value indicating that the resource is relevant to a page because the item of content is found in the title section of the resource. A second likelihood value, described later, is a value indicating that the resource is relevant to a page because the item of content is found in the body section of the resource.

If the item of content is in a body section, the process 300 determines an offset (step 335). An offset is a distance between a position of the item of content in the body section and a beginning of the body section. In some implementations, the offset is a byte offset that the process 300 can determine from the number of bytes between a beginning of the body section and the item of content.

For example, the word "Rome" appearing near the beginning of the body section can be taken as indicating that introductory text in the resource likely describes the place and that the resource is likely relevant to the place. In contrast, if "Rome" appears in a section other than near the beginning of the body section, for example, near the middle of the body, then this can be taken as indicating that "Rome" is not the primary topic described by the resource. In some implementations, a threshold byte offset from the beginning is defined, and the middle of the body is the portion of the body lying outside the threshold byte offset.

Upon determining the offset, the process 300 assigns a second likelihood value to the resource (step 330). For example, if the place recognition engine 128 determines that an item of content is within the threshold byte offset near the beginning of the body section, then it assigns a second likelihood value to the resource. In some implementations, this measure of likelihood is greater than the second likelihood value that the place recognition engine 128 assigns if the item of content is not near the beginning of the body section.

If an item of content that is a name of a place is found in a title of a resource, that can be taken as indicating a greater likelihood that the document is relevant to the place than the likelihood indicated if the item of content is found in the body of the resource. Accordingly, in some implementations, the process 300 assigns the first likelihood value as being greater than the second likelihood value. To do so, the process 300 can associate a weight to the resource so that the likelihood values for the resource will be greater than if the same item is found in the body section. For example, the process 300 can associate a weight of 1 when the item of content is in the title section and a weight of 0 when the item of content is in the body section. In some implementations, the weights associated with the resources can be stored in the database of names of places 130 and can be used to rank the resources determined to be relevant to a distinct place, as described later. In some implementations, for each place to which the resource is found to be relevant, the process 300 can associate a corresponding weight.

Subsequently, the process 300 stores the likelihood values associated with the resource and the item of content and the frequencies of occurrences of the items of content (step 345). The place recognition engine 128 stores the names of distinct places determined to be relevant to the resource, and corresponding unique identifiers obtained from the places database 140 in a database of names of places 130, which database will be described later. The place recognition engine 128 maps the resource to each distinct place to which the resource has been determined to be relevant. For each distinct place stored in the database of names of places 130, the place recognition engine 128 additionally stores an identifier, for example, a URL, pointing to the resource determined to be relevant to the distinct place, measures of likelihoods associated with the resource, and the frequency of occurrence of the name of the place in the resource in the database of names of places 130.

By performing the process 300 described above, the search engine system 120 can identify items of content in multiple resources stored in multiple resource hosts 135, and determine places to which the resources are relevant based on the identified items of content in each resource. The place recognition engine 128 can additionally perform another process to determine that the resource, as a whole, is relevant to a place.

Figure 4:
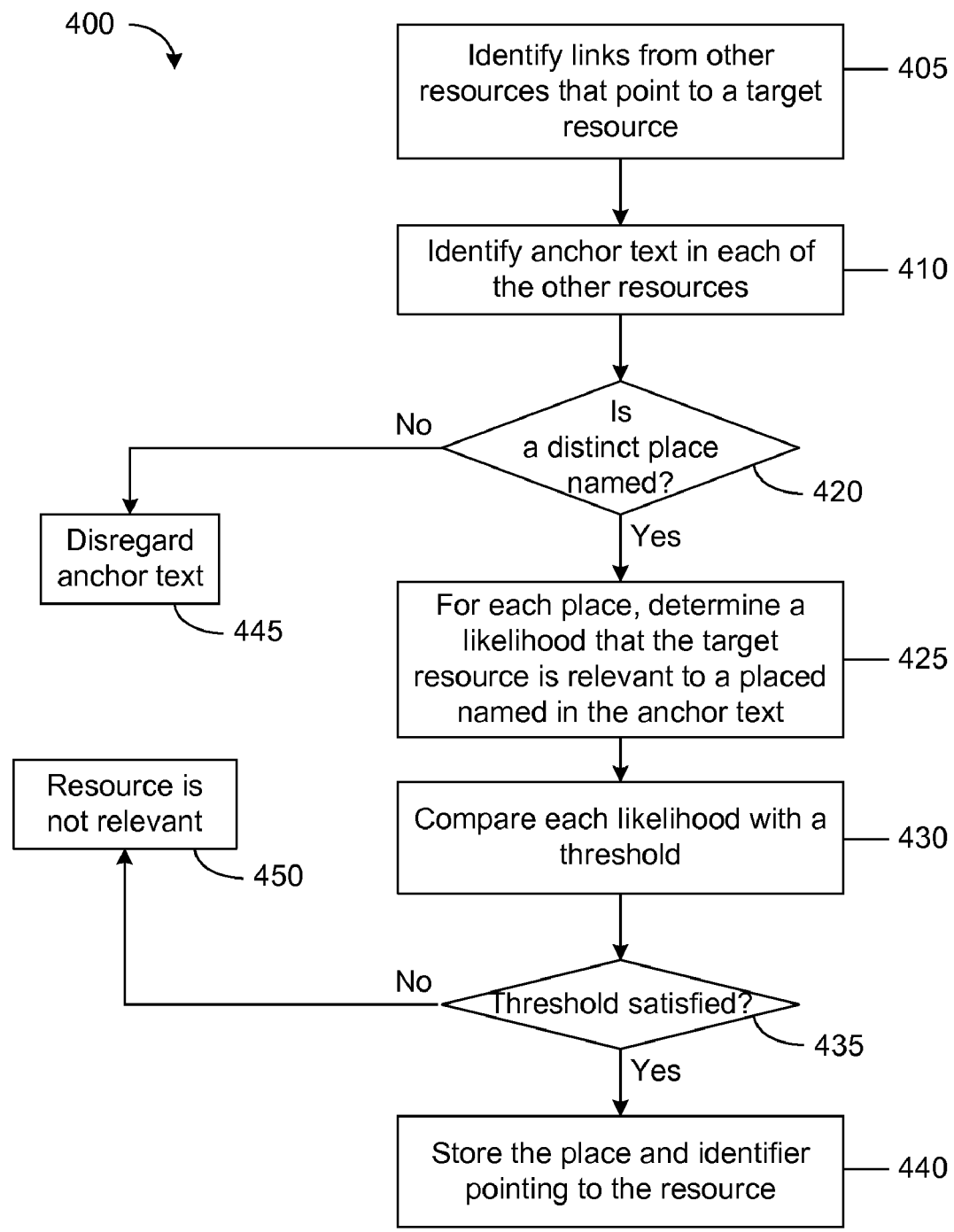
FIG. 4 is a flowchart of an example process to determine whether a resource, as a whole, is relevant to a place.

FIG. 4 is a flowchart of an example process 400 to determine whether a resource, as a whole, is relevant to a place. The process 400 identifies links from other resources that point to the resource, which will be referred to as the target resource (step 405). For example, the place recognition engine 128 can have previously analyzed a resource, such as resource 200, to identify items of content in the resource and to determine a place to which each of the identified items of content is relevant. The place recognition engine 128 additionally performs process 400 to determine if the analyzed resource, as a whole, is relevant to a location. To do so, the place recognition engine 128 identifies incoming links to a resource from other resources. The incoming links can be obtained from a database built by a crawler, for example.

The process 400 identifies anchor text of links that point to the target resource (step 410). Multiple resources 230 can each include one or more anchor texts. For example, two anchor texts in a first resource 230 are "Rome" and "Italy;" two anchor texts in a second resource 230 are "Paris" and "Rome;" an anchor text in a third resource is "our vacation destination." Each of these strings of texts are anchor texts that are part of links that point to the resource 200. A resource can additionally include anchor texts that are part of links that do not point to the target resource. The process 400 disregards such anchor texts.

The process 400 checks each anchor text to determine if a distinct place is named in the anchor text (step 420). For example, the place recognition engine 128 analyzes the anchor texts using the places database 140 to determine if each anchor text is a name of a place. Based on the analysis, the place recognition engine 128 identifies a set of distinct places (place 1, place 2, . . . , place k) that are named in the anchor texts, each being named in a least one anchor text. A presence of an anchor text naming a place in a link that links to the resource being analyzed is considered as indicating that the entire resource being analyzed is relevant to the named place. If an anchor text does not name a distinct place, it is disregarded when determining if the target resource is relevant to a place based on anchor texts (step 445).

For each place named in any of the anchor texts the process 400 determines a likelihood that the target resource is relevant to a place named in the anchor text (step 425). In the above-described example, multiple anchor texts distributed across multiple resources point to the resource 200, and are included in the set of distinct places (place 1, place 2, . . . , place k). Each place in the set can be named one or more times. For each place in the set, the place recognition engine 128 determines a number of anchor texts that names the distinct place. For example, the place recognition engine 128 determines that $n_1$ anchor texts name place 1, $n_2$ anchor texts name place 2, and so on. Thus, the place recognition engine 128 determines a set of numbers ($n_1$, $n_2$, . . . $n_k$) representing numbers of anchor texts that name corresponding places in the set of places (place 1, place 2, . . . , place k). For example, if 50 anchor texts named "Rome," 40 anchor texts named "Paris," and 1 anchor text named "Washington," the place recognition engine determines that n_Rome is 50, n_Paris is 40, and n_Washington is 1. Note that all of the anchor texts are from links that point to the target resource.

In some implementations, to determine a likelihood that the resource 200 is relevant to a distinct place m, the place recognition engine 128 calculates a likelihood in accordance with the following formula:

$$\text{Likelihood (resource is relevant to place } m) = n\_m/(n\_1 + n\_2 + \ldots + n\_k) \quad (1)$$

This is done for each distinct place in the set of distinct places.

Subsequently, the process 400 compares each likelihood with a threshold (step 430). If the threshold is satisfied, then the process 400 determines that the resource is relevant to the place. If not, then the process concludes that the resource is not relevant to the place (step 450). In some implementations, the threshold is 0.75 and the process 400 determines that a target resource is relevant to distinct place m if the likelihood calculated for place m is greater than 0.75. The threshold can be increased or decreased, for example, based on user input.

As described previously, anchor texts can name distinct places and their respective links can each point to the same resource. The resource, consequently, can be relevant to multiple places if the likelihoods that the resource is relevant to the multiple places each satisfy the threshold. Thus, the resource that is linked to by 50 anchor texts' links that name "Rome" and 40 anchor texts' links that name "Paris" can be relevant to both "Rome" and "Paris," but may not be relevant to "Washington." The process 400 stores the distinct place that satisfies the threshold and an identifier pointing to the resource that was analyzed (step 450). For example, the place recognition engine 128 obtains from the places database 140, the unique identifier for each distinct place, and stores in the database of names of places 130 the unique identifier, a name of the associated distinct place, and a URL to the resource. Thus, in the above-described example, the database of names of places 130 will include a unique identifier for "Rome" and "Paris," the names "Rome" and "Paris," and a mapping from each unique identifier to the URL of the resource.

The resource that was analyzed by process 400 is also analyzed by process 300. If the resource is determined to be relevant to a place by performing process 400, then it is highly likely that the name of the place appears as an item of content in the resource. By performing process 300, frequencies of occurrences of the items of content that are names of places is also determined. Thus, in addition to the unique identifier, the names of places, the URL to the resource, and the frequency of occurrence of each relevant distinct place is also mapped to the unique identifier and stored in the database of names of places 130. As the place recognition engine 128 performs processes 300 and 400 for resources stored in the multiple resource hosts 135, it populates the database of names of places 130 with names of multiple places. In some implementations, the database of names of places 130 has a format of a look-up table that is searchable.

The resource that the crawler 124 crawls can be in formats other than in text. In some implementations, the crawler 124 can crawl and identify an audio resource, a video resource, an image resource, or combinations of them. For example, the crawler 124 crawls a resource that includes "Rome" in the title section and embeds an image of the Coliseum. To determine that an image displayed by an image resource is relevant to a place, the search engine system 120 can use alternative text associated with the image resource that is displayed when the image resource cannot be displayed. Alternatively, or in addition, the place recognition engine 128 can determine that an image resource is relevant to a place based on the metadata associated with the image resource. For example, if the search engine system 120 determines that the image data file name of the image resource is "Rome.jpg," then the place recognition engine 128 can determine that the image resource is relevant to "Rome".

As described previously, a resource can include items of content, each of which is a name of one of multiple distinct places. The resource can be mapped to each of the multiple distinct places. For example, for each of the multiple distinct places, a mapping between the URL pointing to the resource and the distinct place is stored in the database of names of places 140. A frequency of occurrence of a name of a place is a number of times that the name of the place occurs in the resource. In some situations, two names of corresponding two distinct places can occur in the resource with equal frequency. In such situations, upon analyzing the resource, if each of the two distinct places can be determined to a sufficient degree of likelihood, as described previously, it can be concluded that the resource is equally likely to be relevant to each of the two distinct places. Then, a mapping between a URL pointing to the resource and each of the two distinct places can be stored.

In some situations, however, sufficient information may not be found in the resource to disambiguate the place reference to a distinct place. For example, if a resource includes a name that is shared by multiple distinct places, but does not include additional information using which the identity of the distinct place to which the name refers can be determined, then it can be concluded that the resource is not relevant to any of the multiple distinct places that share the name. In such situations, references to the resource may not be stored with the name of each distinct place in the database of names of places 130. For example, reference to a resource is not stored if a resource lists the same name of the a place multiple times without any additional information to disambiguate the place reference to a distinct place.

Figure 5:
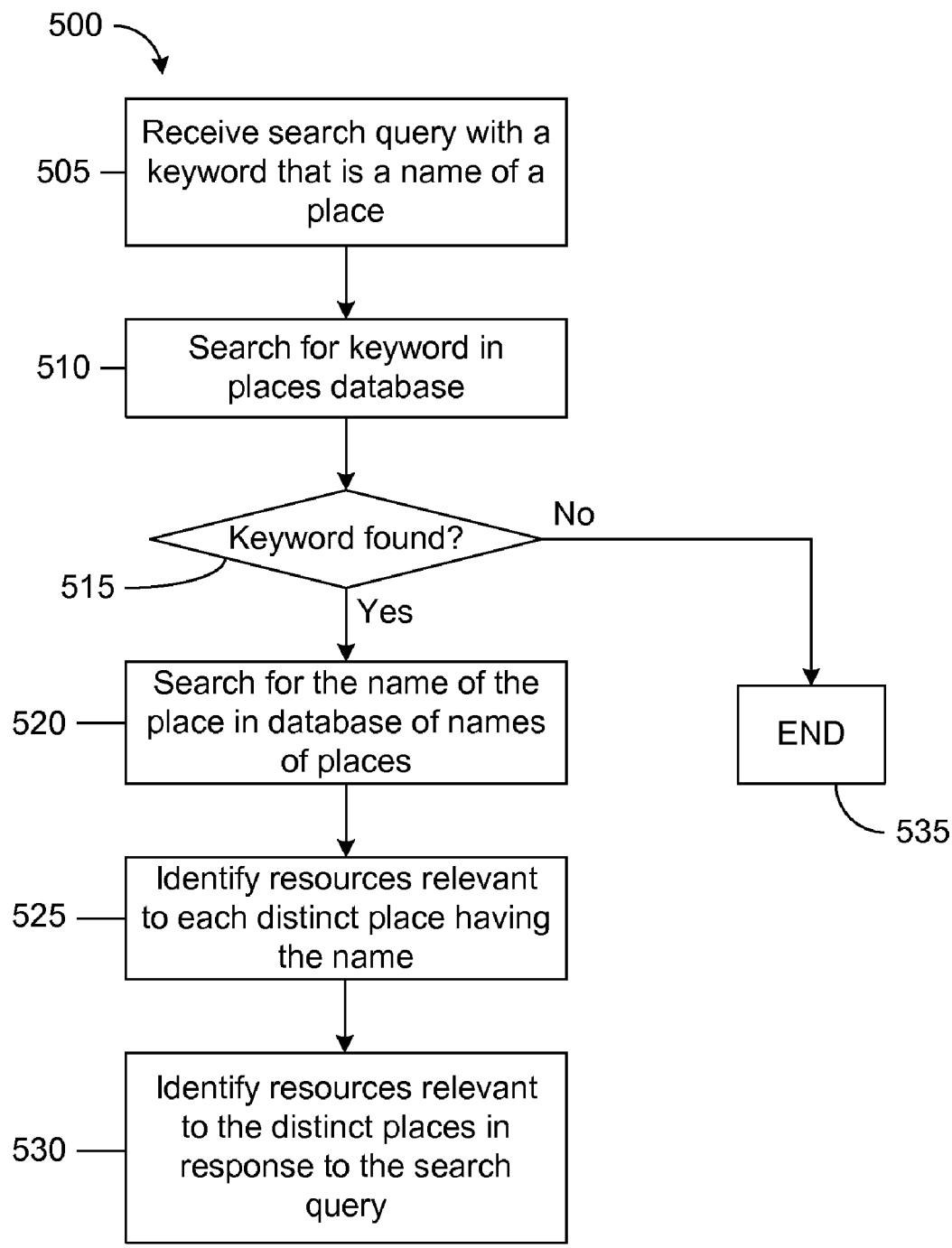
FIG. 5 is a flowchart of an example process 500 for providing search results in response to receiving a search query with a keyword.

FIG. 5 is a flowchart of an example process 500 for providing search results in response to receiving a search query with a keyword (a string of one or more words and characters, for example, "Washington D.C.") that is a name of a place. (The query may include other text, such as exclusion attributes or site selection attributes, that are not considered part of the keyword). The process 500 receives a search query with a keyword that is a name of a place (step 505). For example, a user enters a name of a place as a keyword in text box in a search engine user interface element displayed in a display device. The process 500 searches for the keyword in a places database to determine whether the keyword is a name of a place (step 510), as has been described above.

If the keyword is a name of a place (step 515), the process 500 searches for the name of the place in a database of names of places (step 520).

The process 500 identifies resources relevant to each distinct place having the name (step 525). The resources relevant to each distinct place have previously been determined and stored in the database of names of places 130 by performing processes 300 and 400.

The process 500 identifies resources relevant to the distinct places so that information about, and links to, the resources can be presented in response to the search query (step 530). If the process 500 does not find the keyword in the places database, then the process ends (step 530).

Figure 6:
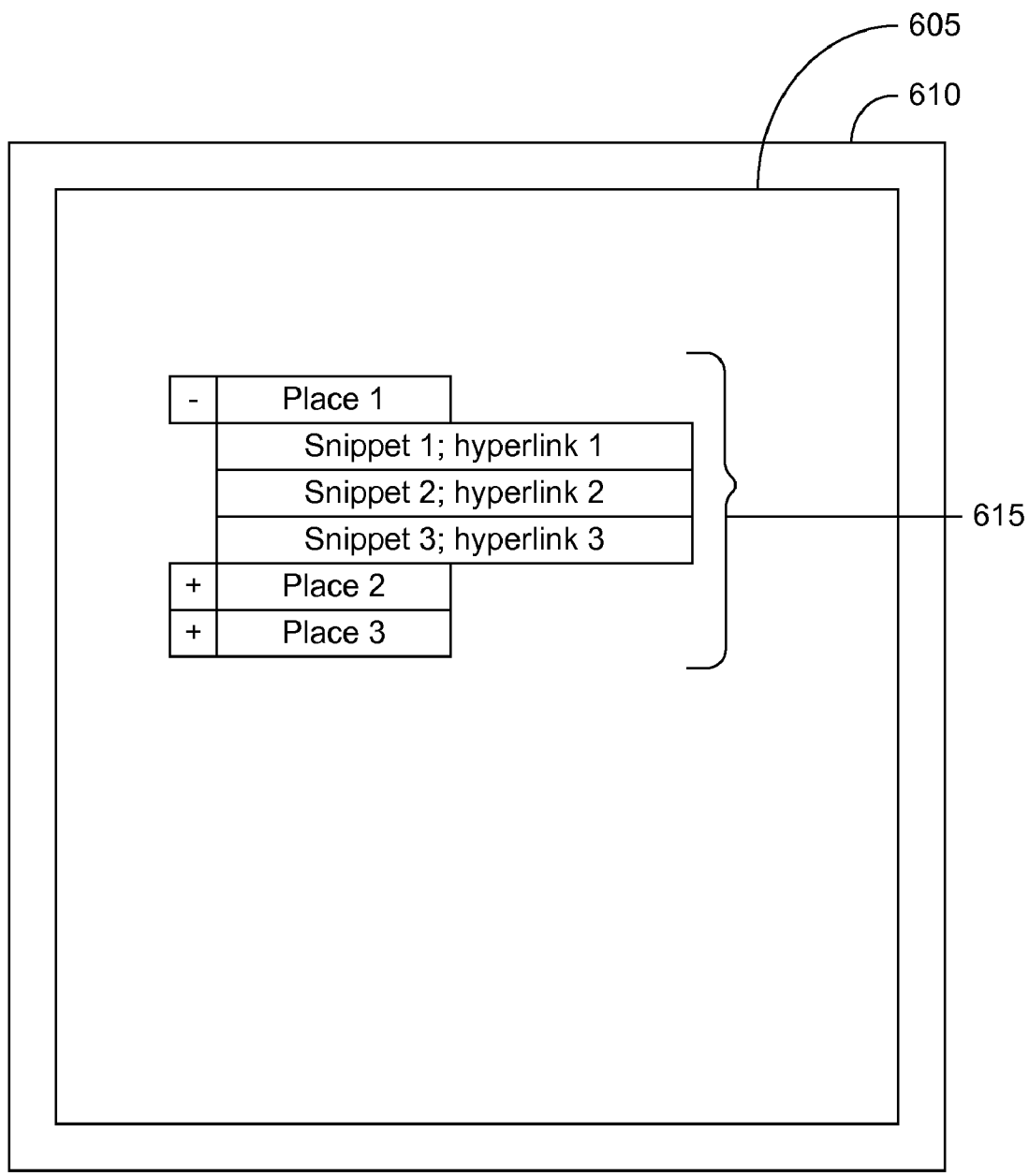
FIG. 6 shows an example web browser window showing a search engine page for receiving a search query keyword and providing search results.

FIG. 6 shows an example web browser window 605 showing a search engine page for receiving a search query keyword and providing search results. In response to receiving a keyword in a textbox displayed in a web page of the web browser window 605, search results 620 can be displayed in the browser 605, as described below.

In some implementations, the search results 620 can be presented by displaying, in the browser 605, a selectable link that displays the name of each place that is determined to match the keyword. For example, if the keyword is "Springfield," then a selectable link displays "Springfield, Va.," another displays "Springfield, Ill.," and another, "Springfield, Mo.," for example. Upon detecting that a selectable link has been selected, the links pointing to resources determined to be relevant to the name in the selected link are displayed. In addition, snippets of information obtained from the resource to which each link points can be displayed adjacent to the link.

In some implementations, the resources associated with the distinct place are ranked. To do so, the process 500 can rank the resources associated with each distinct place in an order based on a frequency of occurrence of the name of the place in the respective resource. In addition, the process 500 can rank the resources based on the likelihood values associated with the resource based whether an item of content was determined to be in the title section or in the body section. The process 500 can further rank the resources based on a decreasing order of the frequency, and provide the resources relevant to each distinct place according to the ranking. The process can optionally also rank the resources using topic-independent resource quality scores previously computed for the resources.

Figure 7A:
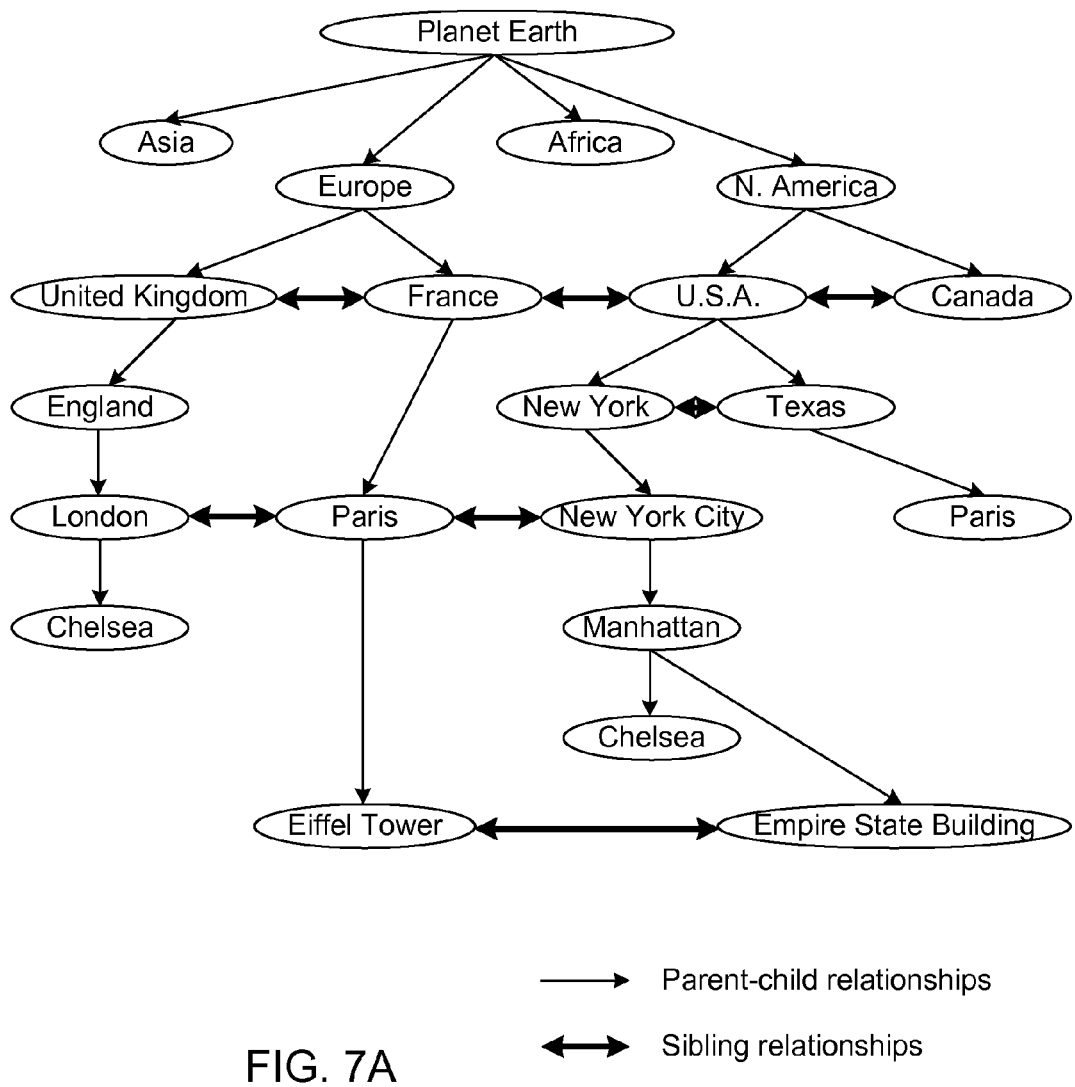
FIG. 7A and FIG. 7B show examples of hierarchical arrangements of geographic locations.
Figure 7B:
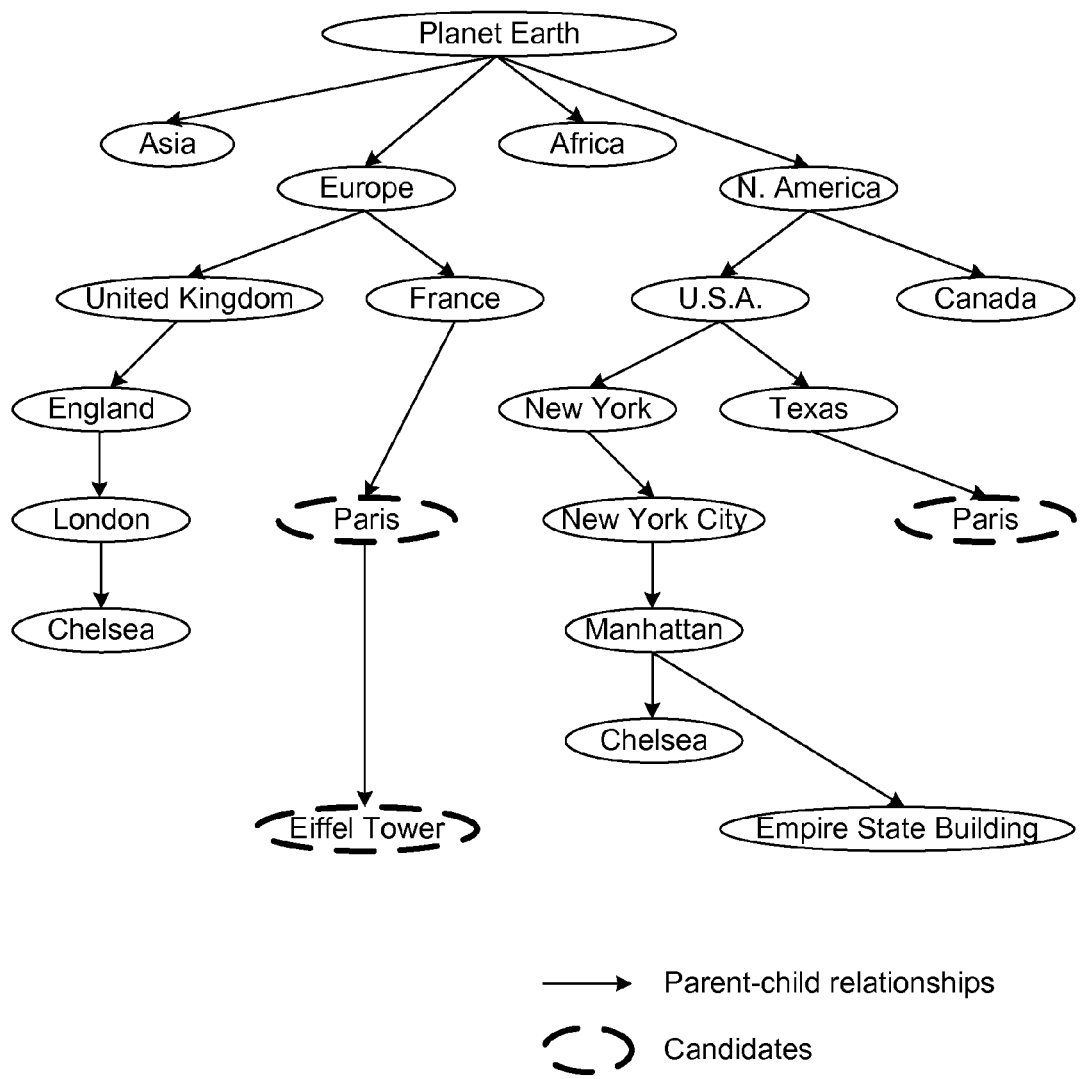

As described previously, the resources are determined to be relevant to distinct places using a hierarchical representation of geographic locations. FIG. 7A and FIG. 7B show example hierarchical representations. All geographic locations on planet Earth are interlinked, for example, in a tree structure in which each geographic location is represented by a corresponding node. In such a structure, a geographic location that represents a parent node contains another geographic location that represents a child node. For example, as shown in FIG. 7A, the location "Europe" is represented by a parent node that has at least two child nodes, namely, one representing the location "United Kingdom" and one representing the location "France." The relationship between the locations is referred to as a "contained by" relationship and that between corresponding nodes is referred to as a parent-child relationship. A location represented by a parent node contains the locations represented by the corresponding child nodes.

FIG. 7A shows a sub-set of the structure that represents all of planet Earth. In the structure that represents the entire planet, the node entitled "Planet Earth" is the root node and has seven child nodes, each representing a corresponding continent. Each child node, in turn, has a number of child nodes, each representing a country. Each location represented by a child node is in a "contained by" relationship with the location represented by the parent node of the child node. This relationship extends to the smallest independently identifiable geographic location, for example, a city. As shown in FIG. 7A, the structure also defines parent-child relationships between a node representing a place and another node representing a popular landmark contained in the place. For example, the tree structure defines a parent-child relationship between a node representing "Paris" and the node representing "Eiffel Tower," the former being a parent node of the latter. This relationship indicates that the popular landmark, "Eiffel Tower," and the location, "Paris," are in a "contained by" relationship because the Eiffel Tower is in Paris. Similarly, the node entitled "Manhattan" and the node entitled "Empire State Building" are in a parent-child relationship. In some implementations, the relationships between geographic locations can be based on structures different from tree structures. For example, the hierarchical relationships between the geographic locations can based on an acyclic directed graph having one root. Such a graph, for example, can represent the fact that the city of Atlanta is in two different counties.

As described previously, the structure is stored in the places database 140, and used by the place recognition engine 128 to determine a distinct place or places to which a resource is relevant. Each distinct place referred to in the resource is a candidate place to which the resource potentially can be relevant.

Consider as an example a resource that includes the following text: ""Last week I was in Paris. It is one of the tourist hubs in the world. Among all the monuments, I liked the Eiffel Tower. I met the mayor Bertrand Delanoe. His phone number is +33 (0)1 42 68 53 00." The place recognition engine 128 determines that "Paris" is a name of a place and that "Eiffel Tower" is a name that refers to a place. The name, "Paris," can refer to either Paris, France or Paris, Tex.

As shown in FIG. 7B, the tree that represents all geographic locations on Planet Earth includes two nodes representing a placed named "Paris." Both nodes represent locations that are candidate places to which the text "Paris" can refer. There may be several additional places on Earth named "Paris." This example pertains only to the subset of the tree structure shown in FIG. 7A and FIG. 7B. From the input text extracted from the resource, there are two candidate places to which "Paris" can be relevant. From FIG. 7B, it can be seen that out of the two candidates for "Paris," the one in France makes a compact graph with "Eiffel Tower," the other location extracted from the resource. Consequently, the place recognition engine 128 determines that the resource is likely relevant to Paris, France.

In some situations, the place recognition engine 128 can employ other information found in a resource, in addition to mentions of names of places, to disambiguate a resource, i.e., to determine a distinct place to which the resource is relevant. The other information can include a name of a person, for example, a celebrity or a political figure, who is uniquely or strongly associated with a distinct place. The other information can also include a telephone number, particularly, an area code or a country code that indicates a place. The other information can additionally include a domain of a URL pointing to a resource. For example, the domain of the URL "www.resource.co.uk" indicates that the resource is relevant to the United Kingdom, whereas the domain of the URL "www.resource.co.au" indicates that the resource is relevant to Australia.

In resources that are news articles, the publication that publishes the articles can provide information that can be used to determine a place to which the news article is relevant. For example, if the text, "Chelsea is an expensive neighborhood," appears in a news article published by The Village Voice, which is a publication associated with New York City, then the place recognition engine 128 can determine that "Chelsea" is likely relevant to New York City. If the same text is extracted from a news article published in a London publication, then the place recognition engine 128 can determine that the relevant location is likely in London.

In some implementations, the places database 140 stores mappings between distinct places and signals that refer to the place. The place recognition engine 128 can determine that a signal is relevant to a place based on the stored mappings. In some implementations, strings of text that uniquely represent a distinct place can be stored in the places database 140 together with the name of the distinct place. For example, the string "highest mountain in Africa" is mapped to "Mount Kilimanjaro," both of which are stored in the places database 140.

In some implementations, strings of text representing that commonly appear adjacent to a place name can be stored in the places database 140. When the text is combined with a name of a distinct place, the combination can narrow a potential number of candidate places that the combination can represent. For example, by itself, the name "Georgia," can represent a state or a country. If a search query includes the word, "Georgia," then both the state and the country are potential candidate places to which the word can refer. If, instead, the search query includes the text "State of Georgia,"

then the adjacent string "State of" narrows the potential candidate places to only the state of Georgia. The places database 140 can store the adjacent text strings together with the names of the distinct places with which the strings can be combined.

In some implementations, the places database can be generated by manually entering into a database, names of places, popular landmarks in the places, GPS coordinates of the places, and other information pertaining to the places. Planet Earth can form the root location of the hierarchy, and each geographic location can form node locations, and a region defined by each set of GPS coordinates can form a child node. For example, "Rome" can be a child location having "Italy" as a parent node. Similarly, "Europe" can be the parent node of "Italy" which originates from the root location. Alternatively, or in addition, any one or more publicly available databases that include information pertaining to places on planet Earth can be used as the places database.

The places database 140 represents a database of entities, in which each entity is a place. If a name is stored in the places database 140, then this indicates that there is a place having the name of the entry. Other databases storing other types of entities, for example, names of people, can be generated by manually entering names of people. In some implementations, if the search query text received from the browser is found in the places database 140, then it can be concluded that the user is searching for a place; otherwise, the database of names of places is not searched. Instead, one of the other databases storing names of people can be searched to determine if the user is searching for a person.

In some implementations, the geographic locations can be represented in a hierarchical data structure in which some nodes in the tree structure are linked by a "sibling" relationship in which the linked nodes share a similarity. For example, in FIG. 7A, the nodes representing "United Kingdom," "France," U.S.A.," and "Canada" are linked with each other by a "sibling" relationship because each of the nodes represents a country. Similarly, the nodes representing "London," "Paris," and "New York" are linked by a "sibling" relationship because each of the nodes represents a city. Sibling relationships also exist between nodes that do not represent geographic locations. For example, the nodes representing "Eiffel Tower" and "Empire State Building" can be linked by a sibling relationship because the nodes represent popular landmarks. Sibling relationships can be expressly represented in the data structure or it can be derived from tags associated with the nodes. In some implementations, each node includes a tag indicating what kind of place or entity the node represents, e.g., a city, a province, a country, and the like. Additionally, multiple nodes can include a tag based on which the places represented by the multiple nodes are related. For example, the tag "dense city" can be included in the nodes that represent cities having high population densities. The tags can be stored in the nodes, for example.

Sibling relationships between multiple distinct places can be represented by one or more words and phrases. For example, "G7 countries" represents a sibling relationship between France, Germany, Italy, Japan, United Kingdom, U.S.A., and Canada. In some implementations, the nodes representing G7 countries can each have a flag bit that is set to indicate that the node represents a G7 country. In contrast, nodes that represent locations that are not G7 countries do not have the flag bit set. Similarly, London, New York, Tokyo, Zurich can be linked by a sibling relationship represented by "financial hubs of the world." Other examples of terms representing a sibling relationship include "French regions," "German states," "densely populated cities," "Olympic venues," "Cities with baseball teams," "Terror supporting countries per the U.S. government," and the like. Sibling relationships can also be formed to link popular landmarks. The terms that link the landmarks can include "Seven wonders," "Major tourist attractions," and the like.

In some implementations, upon receiving a search string that matches a term, the place recognition engine 128 can identify all the places linked by the sibling relationship that the term represents, and present resources relevant to each linked place.

In some implementations, "geographic proximity" relationships can be created between a geographic location and other geographic locations within a threshold distance from the geographic location. In some implementations, geographic proximity relationships can be created by determining a Euclidean distance between two geographic locations from the latitude and longitude coordinates of the two geographic locations. In this manner, an unlimited number of relationships can be formed between places in which one place is a central place and the remaining places are geographically proximate to the central place. In response to detecting that the search query includes the name of a place, resources relevant to the place and other places that are geographically proximate to the place can be included in the search results. In some implementations, an order in which resources relevant to the different places in the geographical proximity relationship are presented in the search results can correspond to a decreasing order of distances between a location represented by a resource and the central location. In other words, resources relevant to places closest to the place, the name of which is included in the search query, can be displayed first, followed by resources relevant to places farther away from the place.

In some implementations, the place recognition engine 128 can receive a resource and identify one or more places of which the received resource is indicative. For example, the place recognition engine 128 can receive a URL of a web page including resources, one or more of which include text identifying or referring to places. The place recognition engine 128 can access the web page, identify such text, and identify the places of which the web page is indicative. To do so, a user interface can be displayed in a display device that is operatively coupled to the client device 105. A user of the client device 105 can enter a URL of a resource in the user interface. The resource to which the URL points can be stored on one of the resource hosts 135. The place recognition system 128 can receive the URL from the client device 105 and search the places database 140 for the received URL. The place recognition system 128 can identify text included in the resource that identifies or refers to places, and can further identify the distinct places to which the text refers. In response to receiving the URL in the user interface, the place recognition engine 128 can provide the identified distinct places for presenting in the display device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, for example, a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and an apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices.

Devices suitable for storing computer program instructions and data include all forms of non volatile memory, media and memory devices, including by way of example semiconductor memory devices, for example, EPROM, EEPROM, and flash memory devices; magnetic disks, for example, internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, for example, as a data server, or that includes a middleware component, for example, an application server, or that includes a front end component, for example, a client computer having a graphical user interface or a Web browser through which a user can interact with an implementation of the subject matter described in this specification, or any combination of one or more such back end, middleware, or front end components. The components of the system can be interconnected by any form or medium of digital data communication, for example, a communication network. Examples of communication networks include a local area network ("LAN") and a wide area network ("WAN"), an inter-network (for example, the Internet), and peer-to-peer networks (for example, ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (for example, an HTML page) to a client device (for example, for purposes of displaying data and receiving user input from a user interacting with the client device). Data generated at the client device (for example, a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, by data processing apparatus, a search query comprising a keyword;
   determining, by the data processing apparatus, that the keyword is a name of a place;
   searching, by the data processing apparatus, for the keyword in a database of names of distinct places, the database uniquely identifying distinct places that have a same name, wherein the database associates each distinct place to one or more digital resources determined to be relevant to the distinct place, wherein for a name of the distinct place, the database includes data identifying the one or more digital resources;
   determining, by the data processing apparatus, that the database associates the keyword with a first place and a second place;
   identifying, by the data processing apparatus, from the database, first one or more resources and second one or more resources that have been determined to be relevant to the first place and the second place, respectively, wherein the database associates the first place with the first one or more resources and the second place with the second one or more resources, and wherein a resource is determined to be relevant to a distinct place based on (i) a number of items of content in the resource that are indicative of each place in a plurality of places including the distinct place and (ii) a number of items of content indicative of all of the plurality of places; and
   in response to receiving the search query, providing, by the data processing apparatus, search results directed to the first place with one or more links to the first one or more resources and separate search results directed to the second place with one or more links to the second one or more resources.

2. The method of claim 1, wherein presenting the two distinct responses further comprises:
   ranking the first one or more resources in an order based on a relevance of each of the first one or more resources to the first place; and
   providing the ranked first one or more resources according to the order.

3. The method of claim 2, further comprising ranking the first one or more resources based on a frequency of occurrence of an item of content indicative of the name of the first place in the first one or more resources.

4. The method of claim 1, wherein the resource is determined to be relevant to the distinct place by:
   finding items of content in the resource that are indicative of a plurality of places including the distinct place;
   determining a plurality of ratios, each ratio being the number of items of content indicative of a place of the plurality of places to the number of items of content indicative of all of the plurality of places;
   determining a greatest ratio of the plurality of ratios; and
   assigning the place corresponding to the greatest ratio as the distinct place.

5. The method of claim 4, wherein the items of content include names of popular landmarks located in the distinct place.

6. The method of claim 4, further comprising:
   determining one or more top greatest ratios excluding the greatest ratio of the plurality of ratios; and
   assigning each place corresponding to the top greatest ratios as distinct places to which the resource is relevant.

7. The method of claim 4, wherein the resource is a document that includes a title and a body, each including text, wherein the item of content indicative of the distinct place is text included in either the title or the body, the method further comprising:
   upon determining that the item of content indicative of the distinct place is in the title, assigning a first likelihood value that the resource is relevant to the distinct place; and
   upon determining that the item of content is in the body, assigning a second likelihood value that is less than the first likelihood value that the resource is relevant to the distinct place.

8. The method of claim 7, further comprising:
   determining an offset of the item of content from a beginning of the body;
   determining if the item of content is near the beginning of the body or not near the beginning of the body based on the offset; and
   upon determining that the item of content is near the beginning of the body, assigning the likelihood value to be greater than the second likelihood value if the item of content is not near the beginning of the body.

9. The method of claim 1, wherein the items of content include names of popular landmarks located in the distinct place.

10. The method of claim 1, wherein the resource is a document that includes a title and a body, each including text, wherein the item of content indicative of the distinct place is text included in either the title or the body, the method further comprising:

upon determining that the item of content indicative of the distinct place is in the title, assigning a first likelihood value that the resource is relevant to the distinct place; and upon determining that the item of content is in the body, assigning a second likelihood value that is less than the first likelihood value that the resource is relevant to the distinct place.

11. The method of claim 10, further comprising:

determining an offset of the item of content from a beginning of the body;

determining if the item of content is near the beginning of the body or not near the beginning of the body based on the offset; and upon determining that the item of content is near the beginning of the body, assigning the likelihood value to be greater than the second likelihood value if the item of content is not near the beginning of the body.

12. A computer-implemented method comprising:

receiving, by data processing apparatus, a search query comprising a keyword;

determining, by the data processing apparatus, that the keyword is a name of a place;

searching, by the data processing apparatus, for the keyword in a database of names of distinct places, the database uniquely identifying distinct places that have a same name, wherein the database associates each distinct place to one or more digital resources determined to be relevant to the distinct place, wherein for a name of the distinct place, the database includes data identifying the one or more digital resources;

determining, by the data processing apparatus, that the database associates the keyword with a first place and a second place;

identifying, by the data processing apparatus, from the database, first one or more resources and second one or more resources that have been determined to be relevant to the first place and the second place, respectively, wherein the database associates the first place with the first one or more resources and the second place with the second one or more resources; and in response to receiving the search query, providing, by the data processing apparatus, search results directed to the first place with one or more links to the first one or more resources and separate search results directed to the second place with one or more links to the second one or more resources; wherein a resource is determined to be relevant to the distinct place by:

identifying a plurality of links in a plurality of resources, each of which includes corresponding one or more links that point to the resource, wherein each of the plurality of links is a string of text;

determining, from among the plurality of links, a subset of links that have respective anchor texts that are names of places; and determining that one of the names of places is a name of the distinct place based on a number of links in the subset of links that have respective anchor texts that are the names of the distinct place.

13. The method of claim 12, wherein presenting the two distinct responses further comprises:

ranking the first one or more resources in an order based on a relevance of each of the first one or more resources to the first place; and providing the ranked first one or more resources according to the order.

14. The method of claim 13, further comprising ranking the first one or more resources based on a frequency of occurrence of an item of content indicative of the name of the first place in the first one or more resources.

15. A non-transitory computer-readable medium tangibly encoding software instructions executable by data processing apparatus to perform operations comprising:

receiving, by data processing apparatus, a search query comprising a keyword;

determining, by the data processing apparatus, that the keyword is a name of a place;

searching, by the data processing apparatus, for the keyword in a database of names of distinct places, the database uniquely identifying distinct places that have a same name, wherein the database associates each distinct place to one or more digital resources determined to be relevant to the distinct place, wherein for a name of the distinct place, the database includes data identifying the one or more digital resources;

determining, by the data processing apparatus, that the database associates the keyword with a first place and a second place;

identifying, by the data processing apparatus, from the database, first one or more resources and second one or more resources that have been determined to be relevant to the first place and the second place, respectively, wherein the database associates the first place with the first one or more resources and the second place with the second one or more resources, and wherein a resource is determined to be relevant to a distinct place based on (i) a number of items of content in the resource that are indicative of each place in a plurality of places including the distinct place and (ii) a number of items of content indicative of all of the plurality of places; and in response to receiving the search query, providing, by the data processing apparatus, search results directed to the first place with one or more links to the first one or more resources and separate search results directed to the second place with one or more links to the second one or more resources.

16. The medium of claim 15, wherein the operations for presenting the two distinct responses further comprise:

ranking the first one or more resources in an order based on a relevance of each of the first one or more resources to the first place; and providing the ranked first one or more resources according to the order.

17. The medium of claim 16, the operations further comprising ranking the first one or more resources based on a frequency of occurrence of an item of content indicative of the name of the first place in the first one or more resources.

18. The medium of claim 15, wherein the resource is determined to be relevant to the distinct place by:

finding items of content in the resource that are indicative of a plurality of places including the distinct place;

determining a plurality of ratios, each ratio being the number of items of content indicative of a place of the plurality of places to the number of items of content indicative of all of the plurality of places;

determining a greatest ratio of the plurality of ratios; and assigning the place corresponding to the greatest ratio as the distinct place.

19. The medium of claim 18, wherein the items of content include names of popular landmarks located in the distinct place.

20. The medium of claim 18, the operations further comprising:
  determining one or more top greatest ratios excluding the greatest ratio of the plurality of ratios; and
  assigning each place corresponding to the top greatest ratios as distinct places to which the resource is relevant.

21. The medium of claim 18, wherein the resource is a document that includes a title and a body, each including text, wherein the item of content indicative of the distinct place is text included in either the title or the body, the method further comprising:
  upon determining that the item of content indicative of the distinct place is in the title, assigning a first likelihood value that the resource is relevant to the distinct place; and
  upon determining that the item of content is in the body, assigning a second likelihood value that is less than the first likelihood value that the resource is relevant to the distinct place.

22. The medium of claim 21, the operations further comprising:
  determining an offset of the item of content from a beginning of the body;
  determining if the item of content is near the beginning of the body or not near a beginning of the body based on the offset; and
  upon determining that the item of content is near the beginning of the body, assigning the likelihood value to be greater than the second likelihood value if the item of content is not near the beginning of the body.

23. The medium of claim 15, wherein the items of content include names of popular landmarks located in the distinct place.

24. The medium of claim 15, wherein the resource is a document that includes a title and a body, each including text, wherein the item of content indicative of the distinct place is text included in either the title or the body, the operations further comprising:
  upon determining that the item of content indicative of the distinct place is in the title, assigning a first likelihood value that the resource is relevant to the distinct place; and
  upon determining that the item of content is in the body, assigning a second likelihood value that is less than the first likelihood value that the resource is relevant to the distinct place.

25. The medium of claim 24, the operations further comprising:
  determining an offset of the item of content from a beginning of the body;
  determining if the item of content is near the beginning of the body or not near the beginning of the body based on the offset; and
  upon determining that the item of content is near the beginning of the body, assigning the likelihood value to be greater than the second likelihood value if the item of content is not near the beginning of the body.

26. A non-transitory computer-readable medium tangibly encoding software instructions executable by data processing apparatus to perform operations comprising:
  receiving a search query comprising a keyword;
  determining that the keyword is a name of a place;
  searching for the keyword in a database of names of distinct places, the database uniquely identifying distinct places that have a same name, wherein the database associates each distinct place to one or more digital resources determined to be relevant to the distinct place, wherein for a name of the distinct place, the database includes data identifying the one or more digital resources;
  determining that the database associates the keyword with a first place and a second place;
  identifying from the database, first one or more resources and second one or more resources that have been determined to be relevant to the first place and the second place, respectively, wherein the database associates the first place with the first one or more resources and the second place with the second one or more resources; and
  in response to receiving the search query, providing search results directed to the first place with one or more links to the first one or more resources and separate search results directed to the second place with one or more links to the second one or more resources;
  wherein a resource is determined to be relevant to the distinct place by:
  identifying a plurality of links in a plurality of resources, each of which includes corresponding one or more links that point to the resource, wherein each of the plurality of links is a string of text;
  determining, from among the plurality of links, a subset of links that have respective anchor texts that are names of places; and
  determining that one of the names of places is a name of the distinct place based on a number of links in the subset of links that have respective anchor texts that are the names of the distinct place.

27. The medium of claim 26, wherein presenting the two distinct responses further comprises:
  ranking the first one or more resources in an order based on a relevance of each of the first one or more resources to the first place; and
  providing the ranked first one or more resources according to the order.

28. The medium of claim 27, the operations further comprising ranking the first one or more resources based on a frequency of occurrence of an item of content indicative of the name of the first place in the first one or more resources.

29. A system comprising:
  data processing apparatus; and
  a computer-readable medium tangibly encoding software instructions executable by the data processing apparatus to perform operations comprising:
  receiving, by the data processing apparatus, a search query comprising a keyword,
  determining, by the data processing apparatus, that the keyword is a name of a place,
  searching, by the data processing apparatus, for the keyword in a database of names of distinct places, the database uniquely identifying distinct places that have a same name, wherein the database associates each distinct place to one or more digital resources determined to be relevant to the distinct place, wherein for a name of the distinct place, the database includes data identifying the one or more digital resources,
  determining, by the data processing apparatus, that the database associates the keyword with a first place and a second place,
  identifying, by the data processing apparatus, from the database, first one or more resources and second one or more resources that have been determined to be relevant to the first place and the second place, respectively, wherein the database associates the first place with the first one or more resources and the second place with the second one or more resources, and wherein a resource is determined to be relevant to a distinct place based on (i) a number of items of content in the resource that are indicative of each place in a plurality of places including the distinct place and (ii) a number of items of content indicative of all of the plurality of places, and in response to receiving the search query, providing, by the data processing apparatus, search results directed to the first place with one or more links to the first one or more resources and separate search results directed to the second place with one or more links to the second one or more resources.

30. The system of claim 29, further comprising a client device operable to transmit the search query to the data processing apparatus over a network.

31. The system of claim 29, wherein the operations for presenting the two distinct responses further comprise:
ranking the first one or more resources in an order based on a relevance of each of the first one or more resources to the first place; and
providing the ranked first one or more resources according to the order.

32. The system of claim 31, the operations further comprising ranking the first one or more resources based on a frequency of occurrence of an item of content indicative of the name of the first place in the first one or more resources.

33. The system of claim 29, wherein the resource is determined to be relevant to the distinct place by:
finding items of content in the resource that are indicative of a plurality of places including the distinct place;
determining a plurality of ratios, each ratio being the number of items of content indicative of a place of the plurality of places to the number of items of content indicative of all of the plurality of places;
determining a greatest ratio of the plurality of ratios; and
assigning the place corresponding to the greatest ratio as the distinct place.

34. The system of claim 33, wherein the items of content include names of popular landmarks located in the distinct place.

35. The system of claim 33, the operations further comprising:
determining one or more top greatest ratios excluding the greatest ratio of the plurality of ratios; and
assigning each place corresponding to the top greatest ratios as distinct places to which the resource is relevant.

36. The system of claim 33, wherein the resource is a document that includes a title and a body, each including text, wherein the item of content indicative of the distinct place is text included in either the title or the body, the method further comprising:
upon determining that the item of content indicative of the distinct place is in the title, assigning a first likelihood value that the resource is relevant to the distinct place; and
upon determining that the item of content is in the body, assigning a second likelihood value that is less than the first likelihood value that the resource is relevant to the distinct place.

37. The system of claim 36, the operations further comprising:
determining an offset of the item of content from a beginning of the body;
determining if the item of content is near the beginning of the body or not near a beginning of the body based on the offset; and
upon determining that the item of content is near the beginning of the body, assigning the likelihood value to be greater than the second likelihood value if the item of content is not near the beginning of the body.

38. The system of claim 29, wherein the items of content include names of popular landmarks located in the distinct place.

39. The system of claim 29, wherein the resource is a document that includes a title and a body, each including text, wherein the item of content indicative of the distinct place is text included in either the title or the body, the operations further comprising:
upon determining that the item of content indicative of the distinct place is in the title, assigning a first likelihood value that the resource is relevant to the distinct place; and
upon determining that the item of content is in the body, assigning a second likelihood value that is less than the first likelihood value that the resource is relevant to the distinct place.

40. The system of claim 39, the operations further comprising:
determining an offset of the item of content from a beginning of the body;
determining if the item of content is near the beginning of the body or not near the beginning of the body based on the offset; and
upon determining that the item of content is near the beginning of the body, assigning the likelihood value to be greater than the second likelihood value if the item of content is not near the beginning of the body.

41. A system comprising:
data processing apparatus; and
a computer-readable medium tangibly encoding software instructions executable by the data processing apparatus to perform operations comprising:
receiving a search query comprising a keyword;
determining that the keyword is a name of a place;
searching for the keyword in a database of names of distinct places, the database uniquely identifying distinct places that have a same name, wherein the database associates each distinct place to one or more digital resources determined to be relevant to the distinct place, wherein for a name of the distinct place, the database includes data identifying the one or more digital resources;
determining that the database associates the keyword with a first place and a second place;
identifying from the database, first one or more resources and second one or more resources that have been determined to be relevant to the first place and the second place, respectively, wherein the database associates the first place with the first one or more resources and the second place with the second one or more resources; and
in response to receiving the search query, providing search results directed to the first place with one or more links to the first one or more resources and separate search results directed to the second place with one or more links to the second one or more resources;
wherein a resource is determined to be relevant to the distinct place by:
identifying a plurality of links in a plurality of resources, each of which includes corresponding one or more links that point to the resource, wherein each of the plurality of links is a string of text;

determining, from among the plurality of links, a subset of links that have respective anchor texts that are names of places; and determining that one of the names of places is a name of the distinct place based on a number of links in the subset of links that have respective anchor texts that are the names of the distinct place.

42. The system of claim 41, wherein presenting the two distinct responses further comprises:

ranking the first one or more resources in an order based on a relevance of each of the first one or more resources to the first place; and providing the ranked first one or more resources according to the order.

43. The system of claim 42, the operations further comprising ranking the first one or more resources based on a frequency of occurrence of an item of content indicative of the name of the first place in the first one or more resources.

44. A system comprising:

data processing apparatus; and a computer-readable medium tangibly encoding software instructions executable by the data processing apparatus to perform operations comprising:

receiving a digital resource that includes a plurality of items of content;

finding items of content in the resource that are indicative of a plurality of places;

determining a plurality of ratios, each ratio being a number of items of content indicative of a place of the plurality of places to a number of items of content indicative of all of the plurality of places;

determining a greatest ratio of the plurality of ratios and a corresponding most likely place from among the plurality of places; and identifying the most likely place as a place to which the digital resource is relevant.

45. The system of claim 44, wherein finding items of content in the resource that are indicative of a plurality of places includes finding an item of content that includes a name of a popular landmark located in the most likely place.

46. The system of claim 44, further comprising:

determining one or more top greatest ratios excluding the greatest ratio of the plurality of ratios; and assigning each place corresponding to the top greatest ratios as distinct places to which the resource is relevant.

47. The system of claim 44, wherein the digital resource is a document that includes a title and a body, each including text, wherein the item of content indicative of the most likely place is text included in either the title or the body, the method further comprising:

upon determining that the item of content indicative of the most likely place is in the title, assigning a first likelihood value that the resource is relevant to the most likely place; and upon determining that the item of content is in the body, assigning a second likelihood value that is less than the first likelihood value that the resource is relevant to the most likely place.

48. The system of claim 47, further comprising:

determining an offset of the item of content from a beginning of the body;

determining if the item of content is near the beginning of the body or not near the beginning of the body based on the offset; and upon determining that the item of content is near the beginning of the body, assigning the likelihood value to be greater than the second likelihood value if the item of content is not near the beginning of the body.

49. A system comprising:

data processing apparatus; and a computer-readable medium tangibly encoding software instructions executable by the data processing apparatus to perform operations comprising:

identifying a plurality of links in a plurality of resources, each link having a target and having the same resource as the link target, and each link having a respective anchor text;

determining, from among the plurality of links, a subset of links that have respective anchor texts that are names of places; and determining that one of the names of places is a name of a distinct place based on a number of links in the subset of links that have respective anchor texts that are the names of the distinct place and identifying the distinct place as a place relevant to the resource.

50. The system of claim 49, wherein determining that one of the names of places is a name of the distinct place further comprises:

determining a likelihood value from the number of links in the subset of links that have respective anchor texts that are the names of the distinct place and the number of links in the subset of links; and determining the likelihood value satisfies a threshold.

51. The system of claim 50, wherein the operations further comprise increasing or decreasing the threshold based on user input.

52. The system of claim 49, wherein the operations further comprise:

receiving a search query comprising a keyword;

determining that the keyword is a name of a place;

searching for the keyword in a database of names of distinct places, the database uniquely identifying distinct places that have a same name, wherein the database associates each distinct place to one or more digital resources determined to be relevant to the distinct place, wherein for a name of the distinct place, the database includes data identifying the one or more digital resources;

determining from the database, that the database associates the keyword with a first place and a second place;

identifying from the database, first one or more resources and second one or more resources that have been determined to be relevant to the first place and the second place, respectively, wherein the database associates the first place with the first one or more resources and the second place with the second one or more resources; and in response to receiving the search query, providing search results directed to the first place with one or more links to the first one or more resources and separate search results directed to the first place with one or more links to the first one or more resources and separate search results directed to the second place with one or more links to the second one or more resources.

53. The system of claim 52, wherein presenting the two distinct responses further comprises:

ranking the first one or more resources in an order based on a relevance of each of the first one or more resources to the first place; and providing the ranked first one or more resources according to the order.

54. The system of claim 53, wherein the operations further comprise ranking the first one or more resources based on a frequency of occurrence of an item of content indicative of the name of the first place in the first one or more resources.

* * * * *